(12) United States Patent
Dutcher et al.

(10) Patent No.: US 6,442,695 B1
(45) Date of Patent: Aug. 27, 2002

(54) ESTABLISHMENT OF USER HOME DIRECTORIES IN A HETEROGENEOUS NETWORK ENVIRONMENT

(75) Inventors: David Paul Dutcher, Austin; William H. Sinclair, Jr., Round Rock; Stanley Alan Smith, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,985

(22) Filed: Dec. 3, 1998

(51) Int. Cl.[7] .............................. G06F 12/14; G06F 9/00
(52) U.S. Cl. ....................... 713/201; 713/202; 709/224; 709/226; 709/229
(58) Field of Search .................................. 713/200–202; 707/201; 709/208, 224, 229, 226, 201

(56) References Cited

U.S. PATENT DOCUMENTS

| | | | | |
|---|---|---|---|---|
| 5,261,102 A | | 11/1993 | Hoffman ..................... 395/700 |
| 5,627,996 A | * | 5/1997 | Bauer ......................... 395/500 |
| 5,671,354 A | * | 9/1997 | Ito et al. ................. 395/187.01 |
| 5,948,064 A | * | 9/1999 | Bertram et al. ............. 709/225 |
| 6,021,496 A | * | 2/2000 | Dutcher et al. ............. 713/202 |
| 6,044,465 A | * | 3/2000 | Dutcher et al. ............. 713/200 |
| 6,092,199 A | * | 7/2000 | Dutcher et al. ............. 713/201 |
| 6,209,032 B1 | * | 3/2001 | Dutcher et al. ............. 709/223 |
| 6,216,162 B1 | * | 4/2001 | Dutcher et al. ............. 709/226 |
| 6,269,405 B1 | * | 7/2001 | Dutcher et al. ............. 709/248 |
| 6,269,406 B1 | * | 7/2001 | Dutcher et al. ............. 709/248 |

OTHER PUBLICATIONS

D. Law, "Communications device of bridge device for controlling comms traffic in a computer network," Derwent Info LTD, Oct. 6, 1999, 2 pgs.*

* cited by examiner

Primary Examiner—Norman M. Wright
(74) Attorney, Agent, or Firm—Duke W. Yee; Jeffrey S. LaBaw; Mark A. Wurm

(57) ABSTRACT

A method for creating and maintaining user home directories and providing for user access across a heterogeneous network of managed servers based on the user account information of the central server. Upon determination that the function of home directories is supported, the target server name is determined and the type of server is extracted from the target server. Based on the server type, appropriate commands are issued to create the necessary directories on the target server. After establishment of the directories, access rights are established to enable the directory to be shared and available to the user through client systems in the network. Connections to the home directory are then made when a request is initiated by the user.

15 Claims, 13 Drawing Sheets

ESTABLISHMENT OF USER HOME DIRECTORIES IN A HETEROGENEOUS NETWORK ENVIRONMENT

BACKGROUND OF THE INVENTION

1. Technical Field

The present invention relates generally to computer networks and more particularly to the establishment of user home directories within a server network which consists of a central server and a set of managed servers running native and non-native operating systems which enables consistent access to individual resources within a heterogeneous server network.

2. Description of the Related Art

The client-server model of computing is a well-known environment. In the model, the user of a computer utilizes a "client" system. The client system runs any of a number of computer operating systems to manage the basic functions that users execute (such as accessing files, executing programs, system administration and the like) as well as to serve as the base against which programs are written. Well-known client operating systems include Microsoft Windows 3.1, Windows for Workgroups, Windows 95, Windows 98, IBM® OS/2® Warp, Apple Macintosh, DOS, many variations of UNIX, and Microsoft Windows NT. The client system serves as the user's workstation, and it may execute programs as well as store some user data.

The server system can also run any of a number of computer operating systems. Well-known server operating systems include Novell Netware, IBM OS/2 Warp Server, IBM AS/400®, Microsoft Windows NT, and many variations of OSF UNIX. The server system is accessed by the client system for specific functions. The functions include, but are not limited to, storage and retrieval of 2 data, storage and execution of applications, and storage of and access to user information.

Server networks are increasingly becoming heterogeneous due to differing problems that can be solved by different servers. User management in these environments requires the creation of different user accounts on the different types of servers. These user accounts eventually have different passwords and possibly different user I.D.'s. A mechanism can be used to allow a single user account definition to be used as the basis for any additional user accounts that exist in the network. The mechanism needs to go beyond current technology options and allow the accounts on all servers to be continuously updated. As users utilize these server based environments, it is still desirable to have locations to store their own unique documents and files. A mechanism is needed to enable these home directories to be established and accessed in a network that consists of a heterogeneous set of servers. When storing data in home directories, it is kept at the server allowing the data to be accessed by the user from many different client systems while also allowing the system's administrator to manage backup/recovery of user data because it is held at the server.

A common term used to refer to a network of related servers is a domain. Within the server domain is a central server acting as the primary domain controller and a plurality of "managed" servers sometimes called secondary servers. Industry standards have been developed (for critical and common functions) to aid in the access from different types of client systems to different types of server systems. The use of these standards on the client and server afford users the opportunity to carry out functions in a consistent manner on a variety of common client and server operating systems. One of the activities that has been standardized is the "authentication" of users. Authentication refers to the process in which a user is validated as being able to complete a log-on and/or access a system. Standard protocols have been defined within the X/Open Server Message Block (SMB) specification and the Open Systems Foundation (OSF) Distributed Computing Environment (DCE) specification.

While many products and operating systems have been developed that utilize the standard protocols, not all products have used the standards. When this occurs, either additional work must be done by the other operating system to implement the unique commands used by a vendor, or access to the other new system and/or product is not allowed if the unique commands are not made available to other vendors. When the commands and/or protocol are not made available, that aspect of the system and/or product is sometimes characterized as being "closed". In regard to user management and authentication, the Microsoft Windows NT operating system is an example of a closed server system that is used in many enterprise computer networks.

Authentication of users is the first step required to access resources in the client and server systems. Servers are increasingly being used to store data that is used company wide and it is desirable to extend the advantages of storing common data on a server to individual user data. Server systems have used different means to establish the concept of user "home directories" on the server system. By storing data in a home directory location, the data is kept at the server allowing it to be accessed by the user from many different client systems within the network while allowing the data to be managed consistent with all other data on the server.

The limitation with previous approaches for establishing a home directory is that the mechanisms used to establish home directories along with the connection to them differs across the network based on the type of client and server system being accessed. Therefore, when a user accesses different types of servers from the same client machine, home directories are not supported in each combination. The present invention establishes a mechanism that enables a user to establish a home directory and connect to it in a heterogeneous server environment. The result is access to server-based user data across a heterogeneous server network.

SUMMARY OF THE INVENTION

It is a general object of this invention to enable user home directory creation across a heterogeneous server network.

It is a general object of this invention to establish the necessary access capabilities to allow user access of their home directories.

It is a more specific object to provide user connection to the user home directory from client systems in the network.

A still further object of this invention is to allow an IBM OS/2 Warp Server acting as a central server or primary domain controller to manage user home directory access from different types of client systems to home directories held at managed Microsoft Windows NT servers.

These and other objects, features and advantages are provided by a method of determining whether home directory creation is supported by servers in a network. Upon determination that home directory creation is functionally supported, the target server name is determined and the type of server is extracted from the target server. Based on the server type, appropriate commands are issued to create the necessary directories on the target server. After establishment of the directories, access rights are established to enable the directory to be shared and available to the account user. Connections to the home directory are then made upon user request.

In a preferred embodiment, the information about a user's home directory is stored in an IBM OS/2 Warp Server. Home directories can be established on a Microsoft Windows NT server.

BRIEF DESCRIPTION OF THE DRAWINGS

For a more complete understanding of the present invention and the advantages thereof, reference should be made to the following detailed description taken in connection with the accompanying drawings in which.

DETAILED DESCRIPTION OF THE PREFERRED EMBODIMENT

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PS/2 ™ series of computers could be used in the present invention. One operating system which an IBM PS/2 personal computer may run is IBM's OS/2 2.0 ™.

In the alternative, the computer system might be in the IBM RISC System/6000 ™ line of computers which run on the AIX ™ operating system. The various models of the RISC System/6000 is described in many publications of the IBM Corporation. The AIX operation system is described in other publications of the IBM Corporation.

Figure 1:
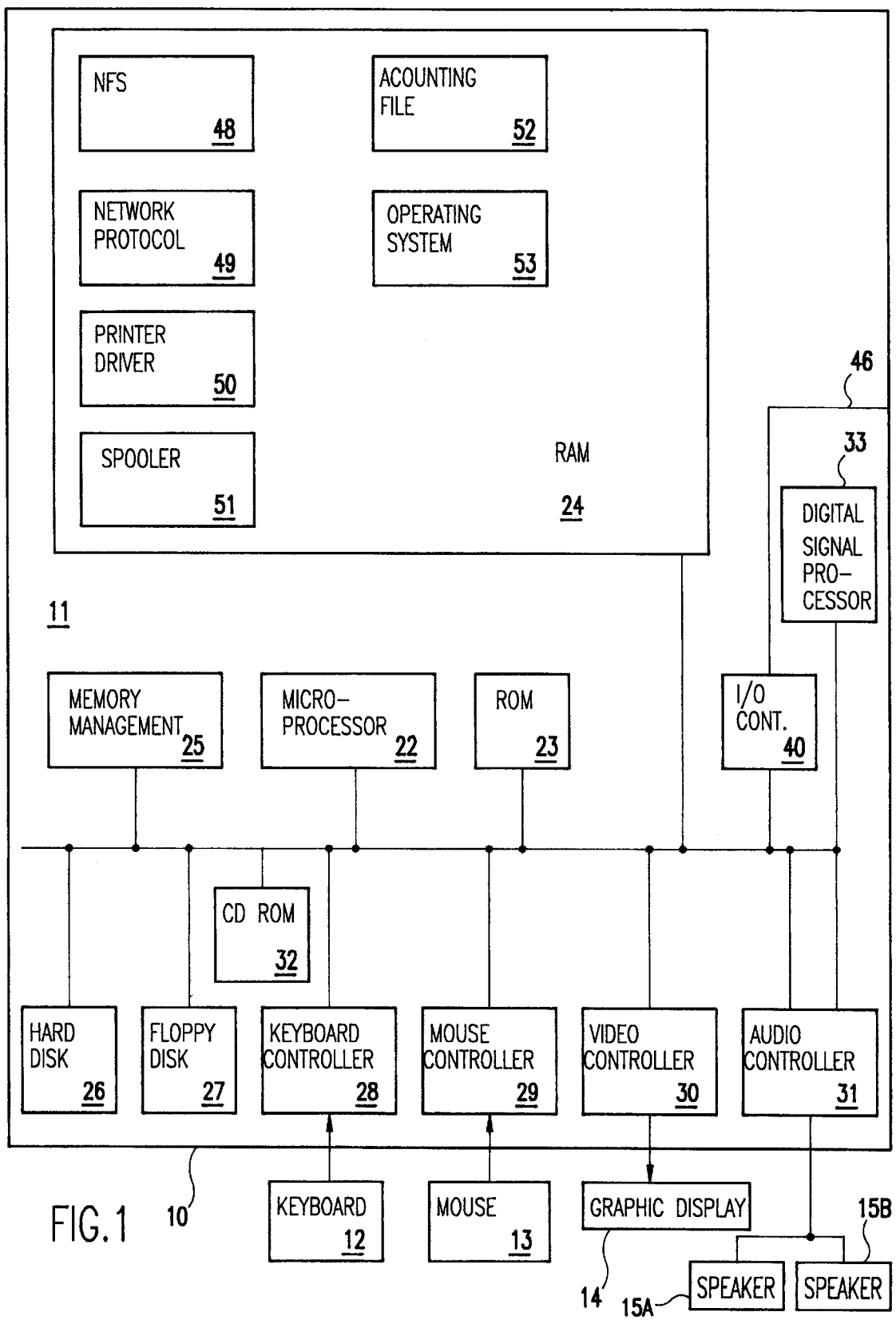
FIG. 1 depicts a computer system configured according to the teachings of the present invention.

While various computers in the computer networks can be used on the computer network by a client-server setup, FIG. 1 is a common computer interface to the computer network wherein a computer 10 comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386,486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM may be used. Other RISC chips made by Hewlett Packard, Sun, Motorola and others may be used in the specific computer.

The ROM 23 contains, among other codes, the Basic Input-Output System (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD-ROM 32 also coupled to the system bus 21 is used to store a large amount of data, e.g., a multimedia program or presentation.

Also connected to this system bus 21 are various I/O controllers: the keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

As described above, one of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted in a transmission medium over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Figure 2:
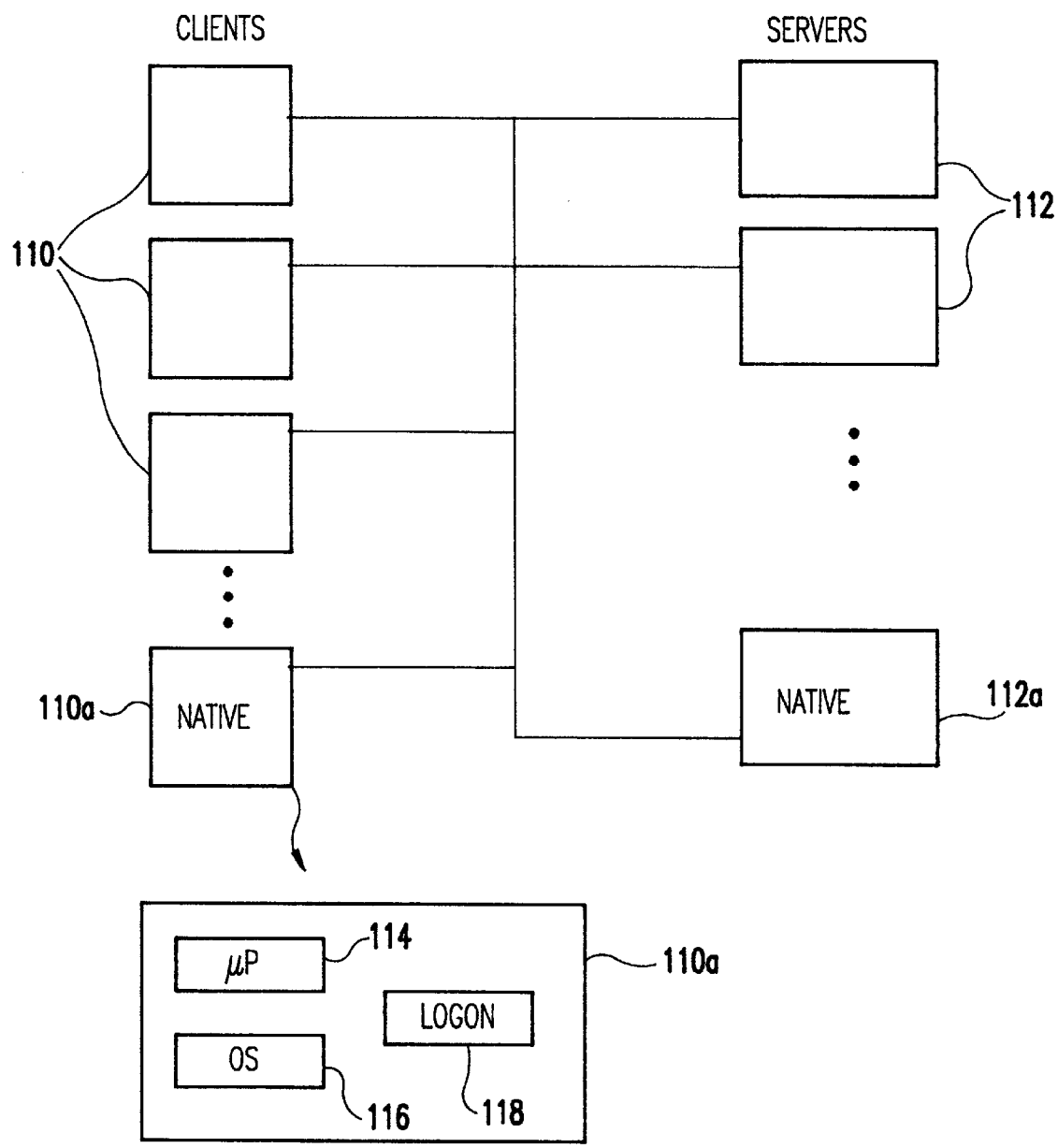
FIG. 2 is a block diagram of a representative computer network in which the present invention is implemented.

Further, the invention is often described in terms that could be associated with a human operator. While the operations performed may be in response to user input, no action by a human operator is desirable in any of the operations described herein which form part of the present invention;

FIG. 2 illustrates a computer network having one or more "client" machines 110 and one or more "servers" 112. A typical client machine 110a is a personal computer or workstation running an Intel processor 114 and the Microsoft Windows NT 4.0 operating system 116. For convenience herein, a machine configured in this manner is sometimes referred to as a "Windows NT client". Any other type of hardware platform that runs Windows NT operating system may be used as the client. According to the present invention, the client also includes an application 118, which provides certain additional functionality to achieve the objects of the present invention. Each client has basic networking hardware to establish a connection out to a server. Thus, for example, a client may have a TCP/IP or NETBIOS connection to the network running over a token ring or Ethernet adapter.

Typically, a server in the computer network is another personal computer or workstation platform that is Intel, Power PC® or RISC® based, and includes an operating system such as Windows NT 4.0, IBM® OS/2® Warp Server, AIX® or the like. At least one server 112a in the computer network is the central server and executes the base operating system or subsystem which is termed "native". This "native" system could be an IBM OS/2 Warp Server, which is sometimes referred to as a "Warp Server". A server 112 is said to be "native" if it is running the same operating system as the server 112a. A "non-native" server is thus a server platform (e.g., a personal computer) running an operating system or subsystem that is different than the operating system running on the server system 112a. Given an IBM OS/2 Warp Server as 112a, examples of such "non-native" servers include, without limitation, Microsoft Windows NT Server, Novell Netware Server, other types of server Message Block (SMB) servers, as well as operating systems that run Open Systems Foundation (OSF) Distributed Computing Environment (DCE) software. An example of the latter is a DCE Cell running Distributed File System (DFS).

Figure 3:
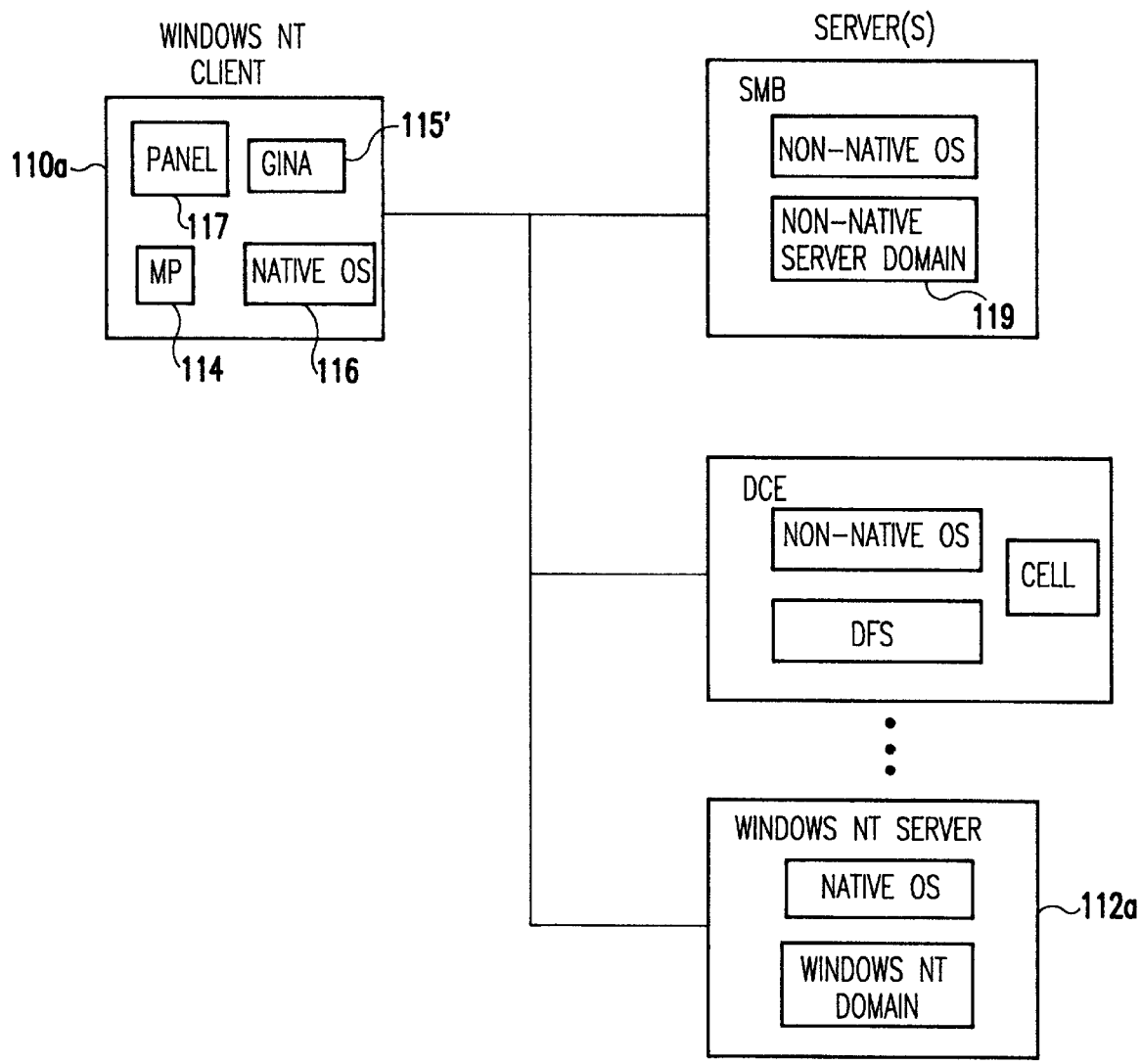
FIG. 3 is a block diagram of the present invention wherein a log-on mechanism is provided in the client running a native operating system to facilitate authentication of a user of the client machine against an account held at a heterogeneous server domain.

In the prior art, a mechanism exists to allow a user at client system 110a to authenticate to a server domain using a user account held at that domain. As seen in FIG. 3, the module GINA 115' ("graphical identification and authorization") is registered on the example Windows NT client. This enables the Windows NT client user to be authenticated against an account held at a native or non-native server domain 119. As used herein, a "non-native server domain" refers to a database of user account information retained at a given server running an operating system that is different than the operating system running at the client system. The term "heterogeneous client-server network" is commonly used to describe an environment in which the client operating system and server operating system are different. This type of environment is common in the client-server model. In contrast, the term "homogenous client-server network" is commonly used to describe an environment in which the client operating system and server operating system are the same.

A non-native server domain is typically supported on a non-native server. Thus, where the user seeks authentication from a Windows NT client, a non-native server domain includes, without limitation, any Server Message Block (SMB) server domain (e.g., IBM Warp Server 4.0), a DCE Cell in which Distributed File System (DFS) is implemented, or other known domains such as UNIX domains. This is illustrated in FIG. 3. Of course, the computer network can also include a Windows NT server domain 112a if authentication is sought from a native server domain.

While "heterogeneous client-server networks" and "homogeneous client-server network" are part of the environment for this invention, they are not specific to it. This invention is specific to the network of servers. In particular, it refers to a "server network" consisting of a central server and a set of managed servers. The managed servers can be native to the central server or non-native to the central server.

In the described embodiment, the central server is an IBM OS/2 Warp Server managing a heterogeneous mix of OS/2 servers and Windows NT servers. One of ordinary skill in the art should appreciate that teachings of this invention are also applicable where the server is running other types, native or non-native servers within the server domain. The present invention allows a single user account from one type of server to be used as the basis to create the corresponding user account on different type of server. After establishment of the user account, the server where the initial account was established will ensure all account updates are replicated to the other server environment on a real time basis.

Figure 4:
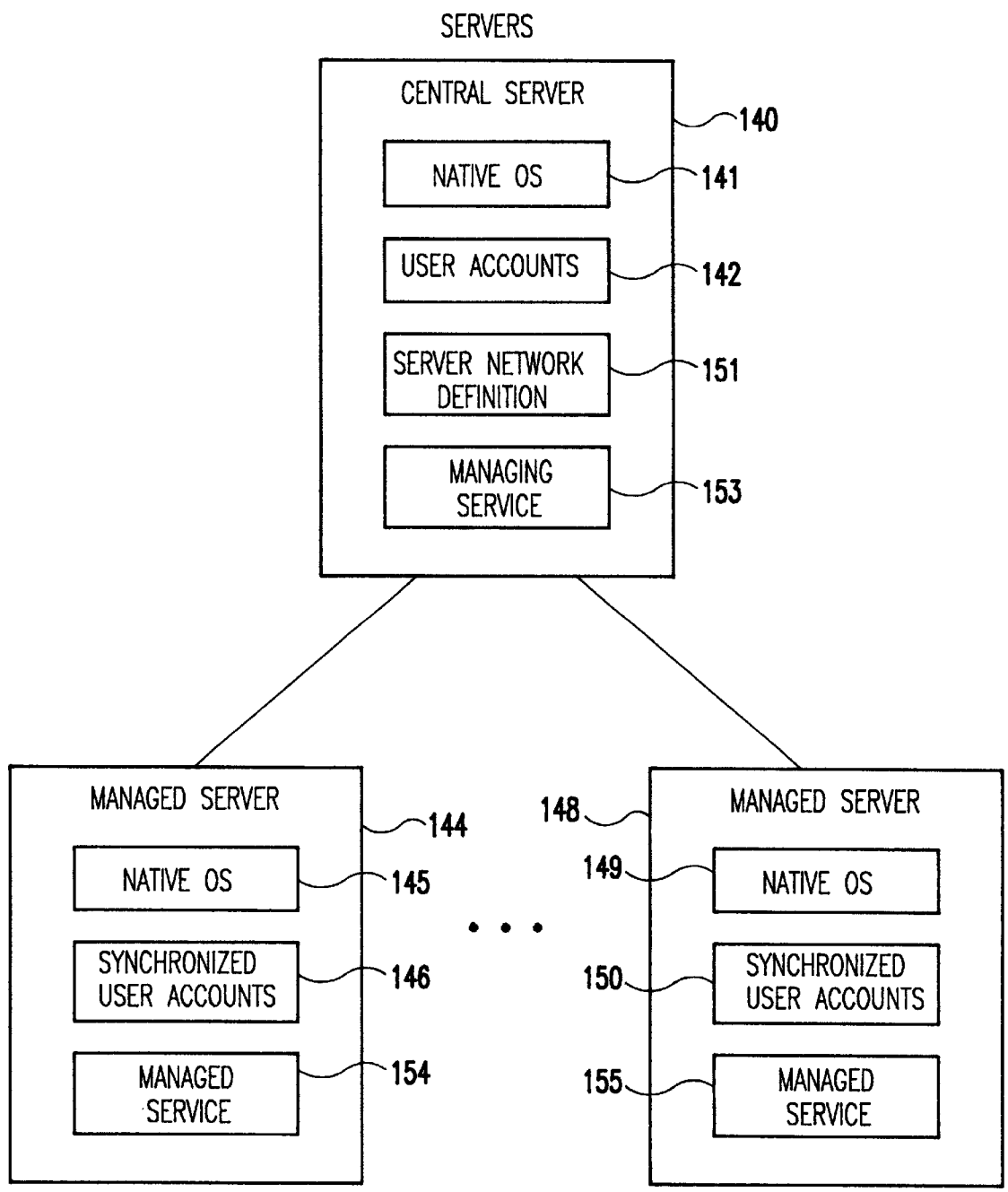
FIG. 4 is a block diagram of a homogeneous network of servers.

FIG. 4 is a block diagram representing a high level operation of the present domain server network having a central server 140 with a native operating system 141, user accounts 142, server network definition 151 and managing service 153. Central server 140 controls homogeneous managed servers 144 and 148. Within managed server 144 is a native operating system 145, synchronized user accounts 146 and managed service 154. Likewise managed server 148 has a native operating system 148, synchronized user accounts 150 and managed service 155. The central server 140 can manage a multiplicity of servers such as servers 144 and 148 having a native OS operating system and synchronized user accounts and managed service.

The server network is defined in the central server by server network definition 151. The server network definition 151 provides the network definition required to link the servers together. It consists of a table of "addresses" that are used to direct and receive communications between specific servers in a network. Whether a broadcast mechanism like NETBIOS or a more directed mechanism like TCP/IP is used for communication, the appropriate network addresses would be included in the table. One skilled in the art would recognize that portions or all of the server network definition could be stored at the managed server(s) and/or the central server.

Similarly the managing service 153 is used to control a managed service 154 within managed server 144 and 148. The managing service 153 and managed services 154 and 155 provide the mechanism to synchronize user accounts.

Managing service 153 and managed service(s) 154 and 155 are the core components used to manage the user accounts across the servers. In a "homogeneous server network" where the servers utilize the same native operating system, the services are implemented through usage of common support that exists on each server. In addition, user accounts 142 and synchronized user accounts 146 are commonly created, updated, and deleted while containing the same information in each.

Prior art exists for user account synchronization in the "homogeneous server network". User account management commands are sent between the central server 140 and the managed server(s) 144 and 148. Since the same commands (application programming interfaces) exist on both servers in a "homogeneous server network", the services are there to support the remote command execution between servers. An example of this is an IBM OS/2 Warp Server created as a Primary Domain Controller which would be a central server and an IBM OS/2 Warp Server created as an additional server which would be a managed server.

Figure 5:
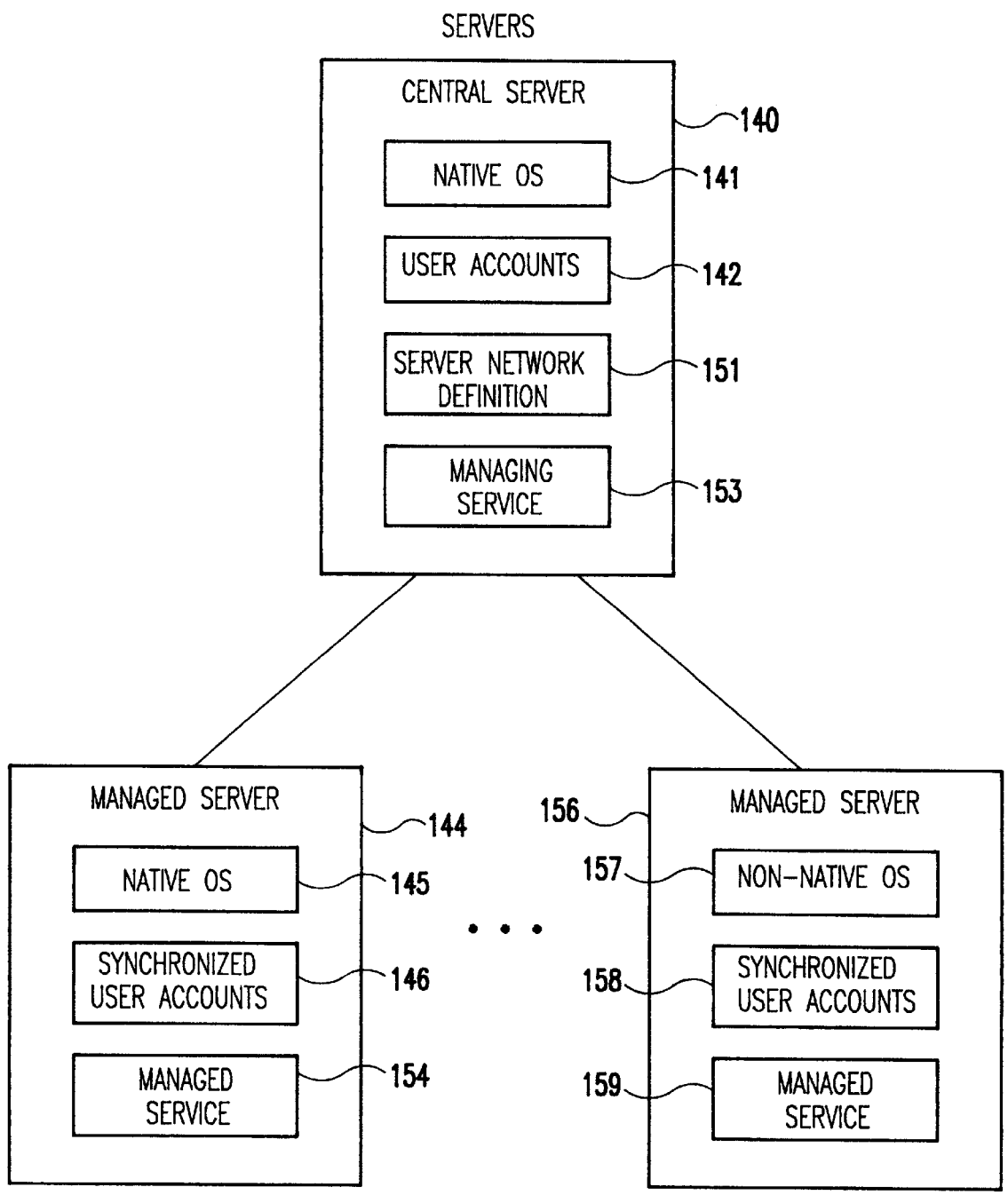
FIG. 5 is a block diagram of a heterogeneous server domain having a plurality of managed servers.

Shown in FIG. 5, central server 140 having a required operating system 141, user accounts defined in 142, a server network definition 151 and a managing service 153. The central server 140 now manages a managed server 144 having a native operating system 145, synchronized user accounts 146, and a managed service 154, as well as heterogeneous server 156 having a non-native operating system 157, synchronized user accounts 158 and a managed service 159. In the described embodiment, the native operating system is an IBM OS/2 Warp Server and the non-native operating system is a Microsoft Windows NT server.

Similar to the "homogeneous server network", managing service 153 and managed service(s) 154 and 159 are the core components used to manage the user accounts across the servers in the "heterogeneous server network". In a "heterogeneous server network" where the servers utilize native OS such as 145 and non-native OS such as 157, common support does not exist on each server. With no common support guaranteed between the central server and the managed server(s), a new and unique mechanism is required to enable the establishment and synchronization of user accounts between the unlike servers.

Managing service 153 and managed service 159 represent the situation where the servers are different with one using a native OS and one using a non-native OS. Managing service 153 is responsible for determining what each managed server requires and delivering it in a format that can be used at the managed server 156. This involves the tracking of user account changes, packaging of the changes in a known format, and sending them to the correct managed server when required. In the described embodiment, the central server 140 is an IBM OS/2 Warp Server and the user account changes are packaged in the same format as used to synchronize to a managed server 144 that is also an IBM OS/2 Warp Server.

Managed service 159 is responsible for implementation of support to maintain communication with central server 140. The service receives the account changes, determines what has been changed with the user account, and implements the correct set of application programming interface calls to effect the changes for the synchronized user accounts 158 on the managed server 156. The mechanism to do this will be different for each non-native OS and is detailed in later figures.

Figure 6:
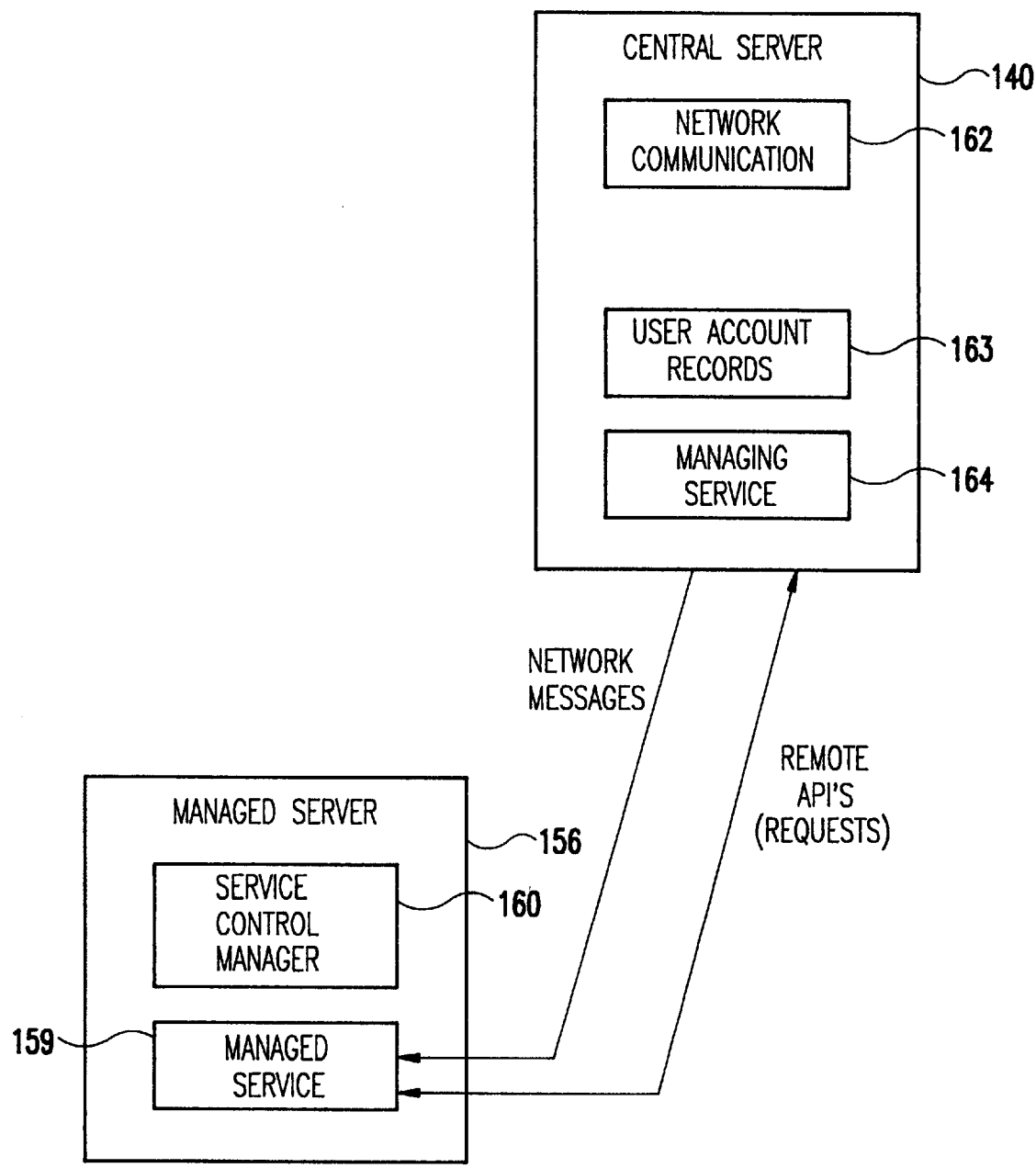
FIG. 6 is a block diagram of a central server managing data flow.

In operation, central server 140 sends information called network messages to the network from a network communication mechanism 162, as shown in FIG. 6, to the managed server 156, while also responding to requests received from managed servers in the network. Through the network, network messages are used to provide requests and responses to the managed service 159 within the managed server 156. A user account subsystem containing a database of records is maintained in user account records 163. Also resident in the central server 140 is the managing service 164 that was described in detail as mechanism 153 in FIG. 5. Central server 140 and managed server 156 make specific functional requests through application programming interfaces (API) which specify requests and responses as described in FIG. 5.

To enable the receipt and processing of requests sent from the central server, a mechanism is required to start the managed service on the managed server. Once started, the managed service continuously awaits status updates and requests. Shown in FIG. 7, a service control manager is required on the managed server. Either when the managed server is started or through a request for a user with administrative capabilities, the managed service is started in step 182. Following the starting of the service, settings that control the operation of the service are initialized in step 183. These settings are described in FIG. 12. To allow the service to respond to commands issued by the administrator, a mechanism must be established. In step 184, a thread in the operating system is launched to allow the service to recover commands as shown in step 185. Commands include the changing of settings, stopping the service, and starting the service.

Figure 7:
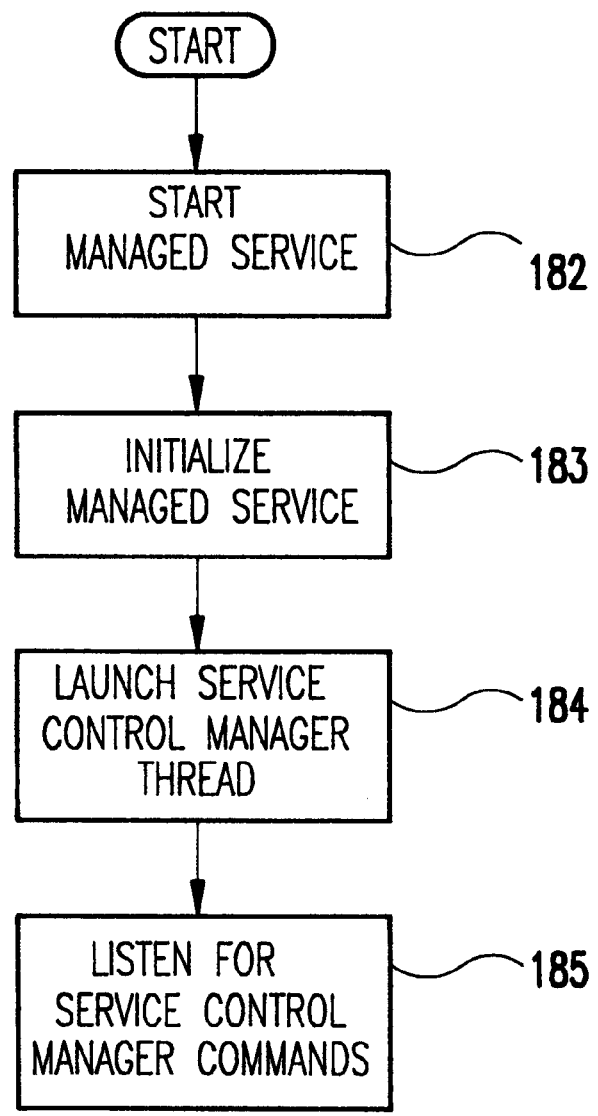
FIG. 7 is a flow chart of the managed service start up.
Figure 8:
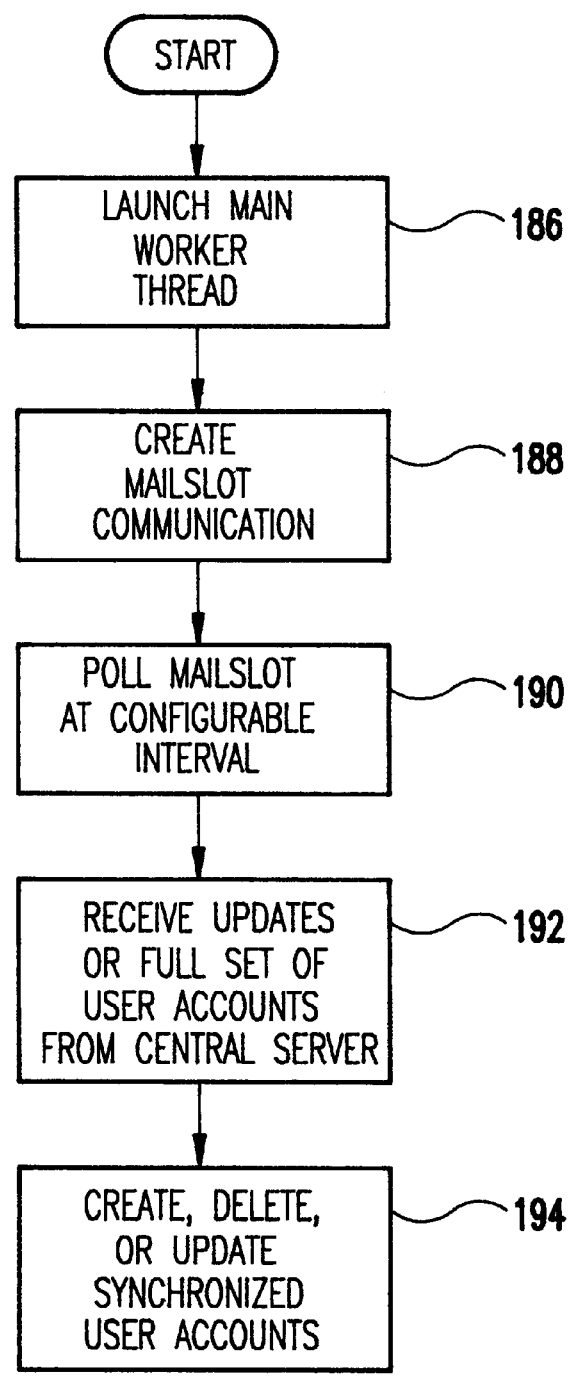
FIG. 8 is a flow chart illustrating managed service operations.

At the same time that the service control manager thread is launched in step 184 of FIG. 7, the main operational support must also be started on the managed server. FIG. 8 shows the steps to establish operational support. A thread or equivalent mechanism is started on the managed server as in step 186. A mailslot or similar communication mechanism is then established at the server in step 188 to enable communication with the central server. To monitor status from the central server, the mailslot or similar communication mechanism must be checked on a regular interval. Step 190 includes the process of checking on a regular basis. For each server in the heterogeneous server network, the communication support must be implemented as appropriate for the non-native OS. Steps 192 and 194 introduce the receipt and processing of user account requests from the central server. The main worker thread shown in step 186 is used to execute those steps which are detailed in FIG. 12 and FIG. 13, and are implemented for each heterogeneous network server.

Figure 9:
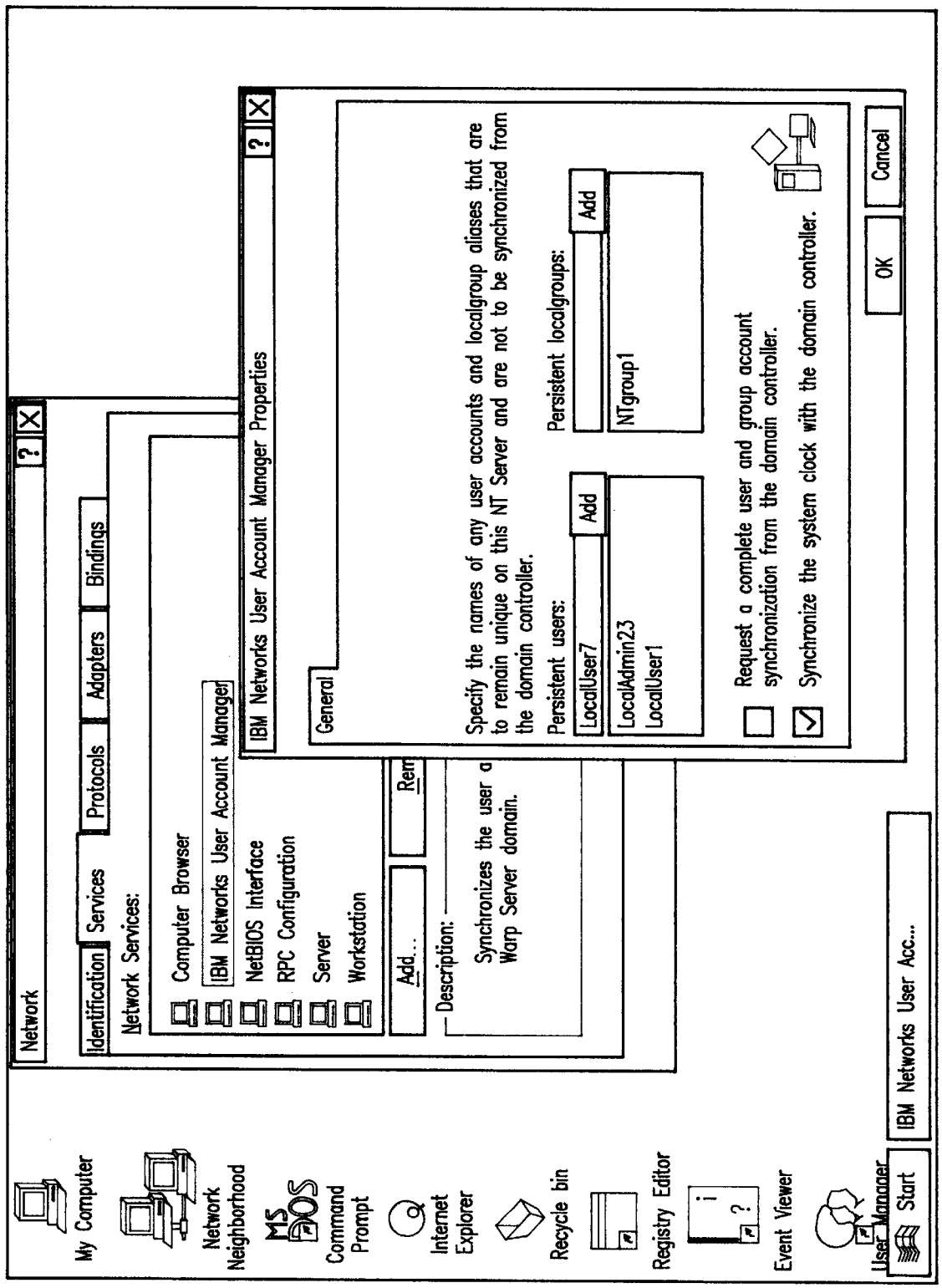
FIG. 9 is a representation of the general properties display screen used to manage services.
Figure 10:
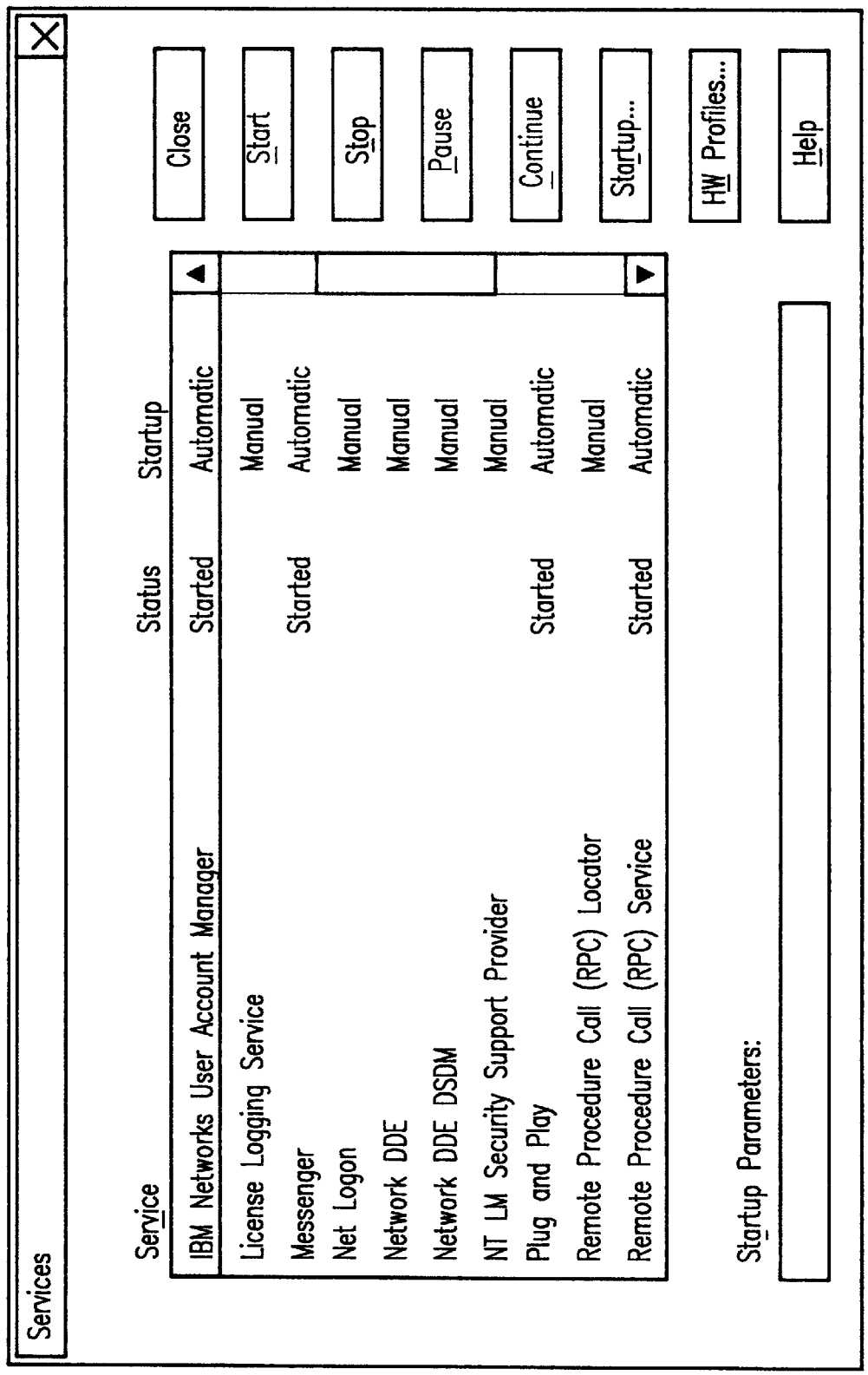
FIG. 10 is a screen representation of the managed server definition on a managed server.

The establishment of the managed service at the network server can be through local administration as shown in the screen printout of the managed service screen shot shown in FIG. 9 and FIG. 10. To define the service which must be active to enable the ongoing synchronization of user accounts, the service is installed on the server that is to be managed. The method and display of the service may differ by the type of heterogeneous server in the network, and FIG. 9 shows the service in the described embodiment of a Microsoft Windows NT server as a managed server. Communication between a central server and the managed servers is required. In FIG. 9 the managed service which is called "IBM Networks User Account Manager", is established as part of the Network portion of the server. Additional settings can be established through properties associated with the managed service. Synchronization of the clock on the managed server with the central server clock is one of the settings that is made.

FIG. 10 shows additional controls used for the managed service on the managed server. For synchronization of user accounts to be in effect, the managed service must be active. In FIG. 10, the screen shot of the screen used by the administrator to control the service is shown. The method to start can either be manual or automatic. The status of the service should also be able to be retrieved to allow the administrator to know whether synchronization is active. The status column in FIG. 10 is an example of a status display.

Figure 11:
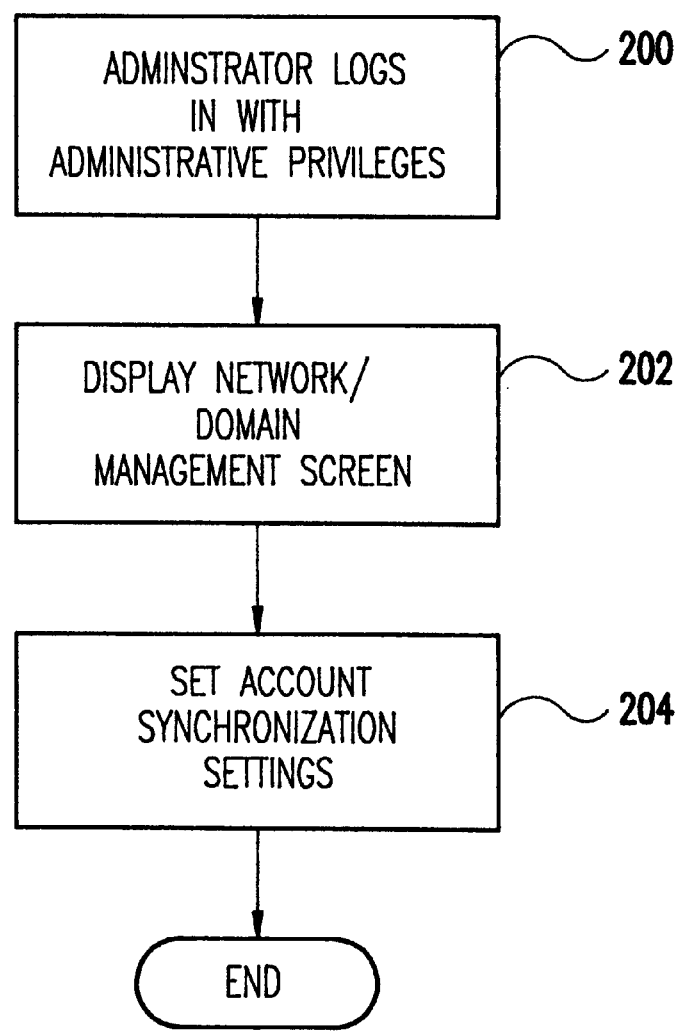
FIG. 11 is a flow chart illustrating the setting of central server synchronization values.

To establish and control the managing service on the central server, the server must be accessed with administrative privilege as shown in step 200 of FIG. 11. The managing service needs to exist on the server and in the case of the described embodiment of the central server being in IBM OS/2 Warp Server, it is the LAN manager service used for homogeneous servers. Step 202 shows the access to the settings that control operation of the managing service. The actual settings are done in step 204. Settings that are needed include the interval that status updates (described as pulses) are exchanged from the central server to the managed server(s), and how much difference is allowed between the servers. The combination of these settings determine how frequently updates occur to synchronize the user accounts between servers.

The present invention is suited for an environment in which a user is capable of accessing the central server and managed servers. Therefore, the description of how the user accounts are created and synchronized throughout the server environment is one mechanism to ensure that the users are known throughout the applicable server network. For a full description of the establishment and synchronization of user accounts in a heterogeneous network, see patent application entitled "User Account Establishment and Synchronization in Heterogeneous Networks" by Dutcher et al., filed Oct. 19, 1998, having an application Ser. No. of 09/175,048 and being commonly assigned to the same assignee as the present invention, the teaching of which are herein incorporated by reference. One skilled in the art would recognize that other mechanisms could be utilized to enable users to access multiple servers in a server network. The invention is not dependent on the mechanism used to enable the user to access multiple servers within the server network.

Figure 12:
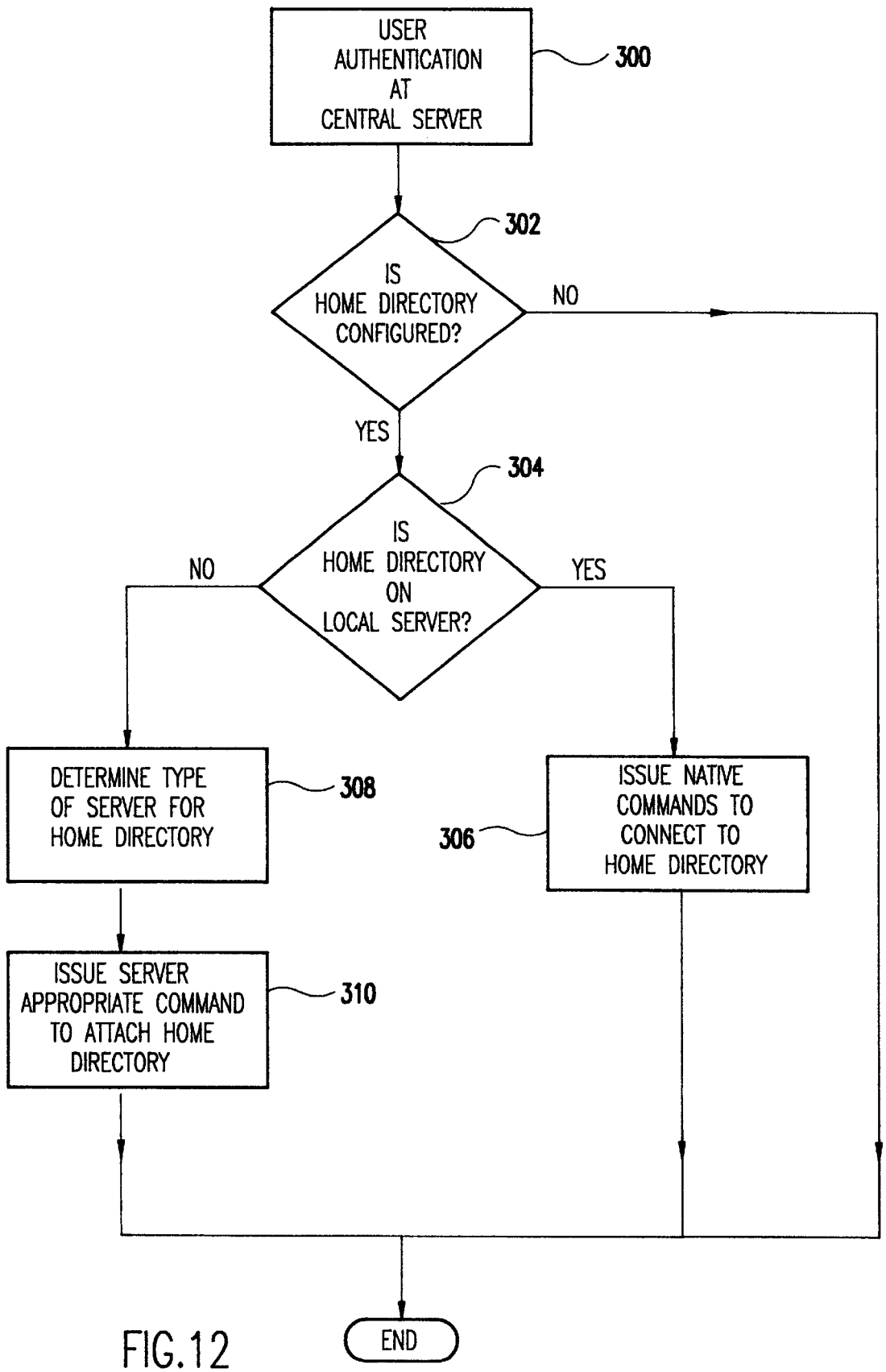
FIG. 12 is a flow chart illustrating central server processing of home directory support.
Figure 13:
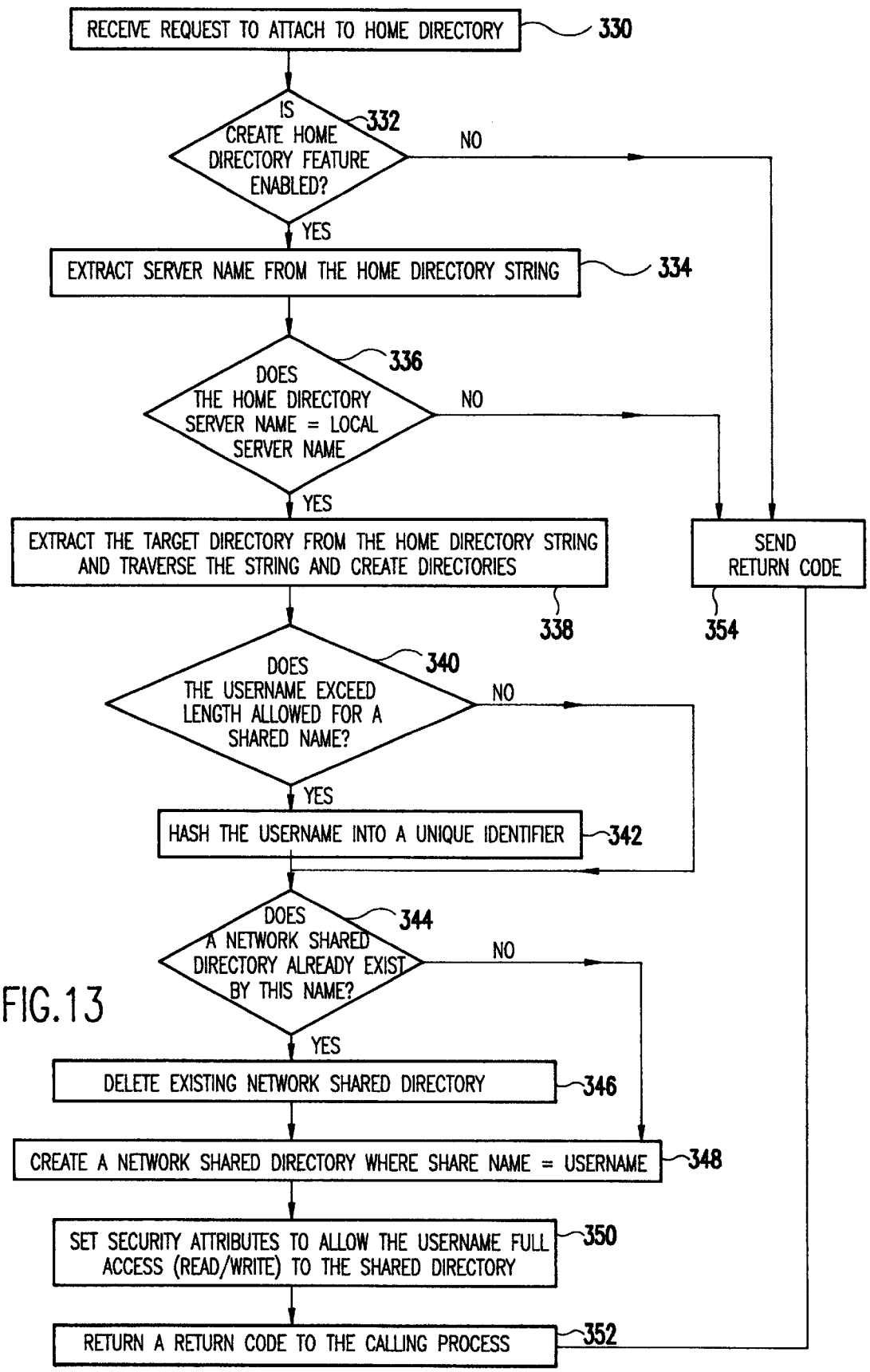
FIG. 13 is a flow chart illustrating managed server processing of home directory support.

The invention is implemented as shown and described in FIG. 12 and FIG. 13. Authentication has been previously described in conjunction with FIG. 3. In FIG. 12, the authentication at the central server is initiated as shown at step 300. During the authentication processing, as shown in step 302, a check is made to determine whether the user accessing the central server has a home directory specified. The method of configuring the home directory and the location holding this information can be unique to each type of server implementing the support. If the user has a home directory configured, a check can be made as shown in step 304 to determine if the home directory is on the central server or on a managed server in the server network. If the home directory is on the central server, step 306 shows that commands native to that server can be issued to connect to the home directory location which is support that has been implemented by many different types of servers within a native operating system. Step 308 begins the support that is central to this invention and which has not been described or implemented prior to this invention.

In step 308 as shown in FIG. 12, a check is made to determine the type of server that the home directory is located on. In the preferred embodiment, the check is made through parsing of the string containing the home directory location in the user's account on the central server. A request is sent to the server within step 308 which generates a response from the target managed server which is then used to determine the type of server. Based on the type of server, step 310 shows the stage where the appropriate command is issued to the managed server to request attachment of the home directory for the user authenticating.

FIG. 13 shows the steps carried out at the managed server containing the home directory for a specified user in the server network. The initial processing at the managed server is instigated upon receipt of a request from the central server to attach a home directory for a given user, this is shown in step 330. Upon receipt of a request, a check is made in step 332 to determine whether the support for the home directory feature has been enabled. If the support for home directory is enabled, step 334 shows the stage where the server name is extracted from the home directory path name that was sent as part of the request which was received at the managed server. As a check to ensure the request is being processed on the proper server and to support network communications where broadcasting of requests is utilized, in step 336 a check is made to determine whether the server name in the home directory string is the same as the server name that received the request. If it is the proper server, the home directory string is parsed to determine the correct directory location. If the directories do not already exist, they are created as shown in step 338. To make a section of storage unique for the user, a directory is created based on the unique user name of the individual accessing the server. Steps 340 and 342 are a check to ensure the username is of the appropriate length for the directory path and share support available for the type of server. If necessary, step 342 uses an algorithm to create a unique identifier that can be used for the user name. A hashing technique can be used to reduce the length of the user name. Depending on the approach used at the server, shared directory information may be saved between usages of the support in which case the shared directory created must be deleted as shown in steps 344 and 346.

To enable the user to access the home directory, it must be made a shared resource on the managed server. Each type of server may have different commands to create and manage access to shared resources on the servers. Step 348 shows the stage where a network shared directory is created that is unique to the username of the user owning the home directory. Once the shared directory is created, access rights must be given to enable the user to read/write/create within the directory. Server appropriate commands are executed in step 350 to give the user the proper privileges for the directory. To inform the server domain that all is complete, a return code shown in step 352 is made to the calling user. Likewise, if the home directory feature is not enabled or does not have a local server name, a return code is sent as shown in step 354.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

What is claimed is:

1. A method for creating user home directories within a heterogeneous server network, comprising the steps of:

following authentication of a user at a central server, determining if a home directory function is supported within the heterogeneous server network;

determining a name of a target server for creation of a home directory;

extracting a type of server for the target server named;

issuing appropriate commands based on the type of target server to create and/or attach a home directory on the target server; and granting access to the user throughout the heterogeneous server network, to the home directory created on the target server.

2. The method as recited in claim 1, wherein the central server is running IBM OS/2 as a native operating system.

3. The method as recited in claim 2, wherein the target server is running Windows NT as a non-native operating system.

4. The method as recited in claim 1, wherein the central server is running Window NT as a native operating system.

5. The method as recited in claim 4, wherein the target server is running IBM OS/2 as a non-native operating system.

6. The method as recited in claim 1, wherein the target server is running IBM OS/2 as a non-native operating system.

7. The method as recited in claim 1, wherein the target server is running Windows NT as a non-native operating system.

8. A computer program product in a computer readable medium for creating user home directories within a heterogeneous server network, comprising:

means responsive to authentication of a user at a central server, for determining if a home directory function is supported within the heterogeneous server network;

means for determining a name of a target server for creation of a home directory;

means for extracting a type of server for the target server named;

means for issuing appropriate commands based on the type of target server, to create and/or attach a home directory on the target server; and means for granting access to the user throughout the heterogeneous server network, to the home directory created on the target server.

9. The computer program product as recited in claim 8, wherein the issuing means is responsive to administrative input at installation.

10. The computer program product as recited in claim 8, wherein the issuing means is responsive to user input at logon.

11. A computer connectable to a heterogeneous server network comprised of central and managed servers running native and non-native operating systems, comprising:

a processor;

an operating system running on the processor;

a mechanism for creating user home directories within the heterogeneous server network, comprising:

means following authentication of user at a central server for determining if a home directory function is supported within the heterogeneous server network;

means for determining a name of a target server for creation of a home directory;

means for extracting a type of server for the target server named;

means for issuing an appropriate command based on the type of target server named, to create and/or attach a home directory on the target server; and means for granting access to the user throughout the heterogeneous server network, to the home directory created on the target server.

12. The computer as recited in claim 11, wherein the native operating system is IBM OS/2 and the non-native operating system is Windows NT.

13. The computer as recited in claim 11, wherein the native operating system is Windows NT and the non-native operating system is IBM OS/2.

14. The computer as recited in claim 11, wherein the issuing means is responsive to administer input at installation.

15. The computer as recited in claim 11, wherein the issuing means is responsive to user input at logon.

* * * * *